April 21, 1953      C. C. ENLOW      2,635,327
HACK SAW
Filed Oct. 7, 1950
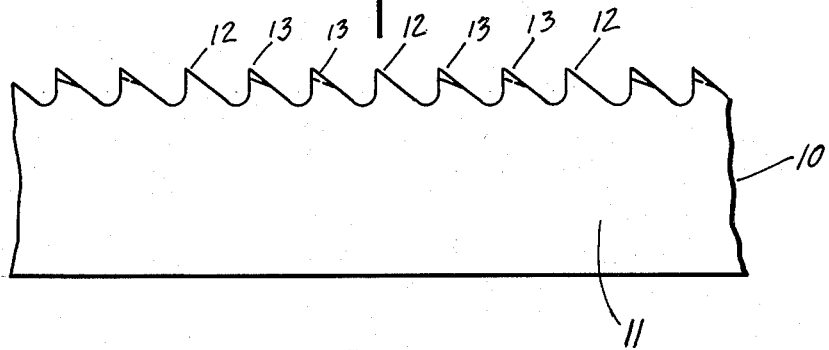
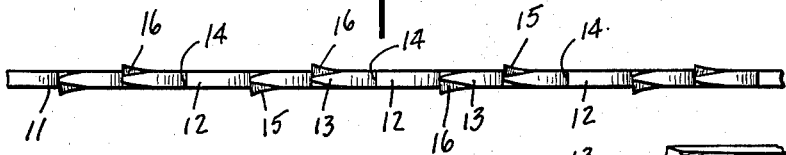
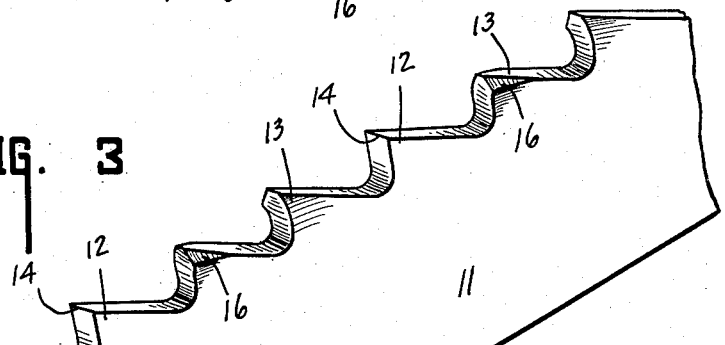
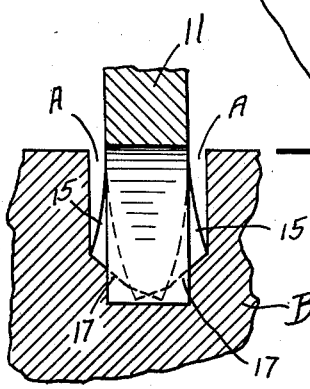
INVENTOR.
CHARLES C. ENLOW.
BY
Lockwood, Hahn, Galt & Woodard,
ATTORNEYS.

Patented Apr. 21, 1953

2,635,327

UNITED STATES PATENT OFFICE 2,635,327

HACK SAW

Charles C. Enlow, Huntingburg, Ind.

Application October 7, 1950, Serial No. 189,035

2 Claims. (Cl. 29—95)

This invention relates to a hack saw and more particularly to that variety which includes both raker and set teeth and which is employed to saw metal of all kinds and types.

The conventional hack saw in use today has a relatively short life because of the high incidence of tooth chipping and breakage. It is the primary object of this invention to provide a hack saw of such toothed construction that the effective life is greatly increased and extended.

It is a further object of this invention to provide a hack saw having a tooth construction of such character that the so-called raker teeth do much more work than in the conventional saw.

It is a still further object of this invention to reduce the cutting edge of the so-called set teeth in order that the saw will cut or "melt" deeper into the stock with each throw than will the conventional saw.

It is a still further object of the present invention to provide a saw which is inexpensive, durable and which cuts much truer than the standard ones.

The principal feature of the present invention resides in beveling that side of each set tooth that extends laterally of the saw body in such manner that the cutting edge of the tooth is inclined at an angle of approximately 45 degrees relative to said saw body. With this construction, the cutting edge area of each set tooth is reduced. Given the same number of pounds pressure upon the teeth it logically follows that there will be a proportionately greater pressure per fraction of an inch upon the reduced cutting edges than there would be upon a longer edge. In short, by reason of applicant's invention the pressure or force is concentrated into a smaller area. The net result is a deeper cut by a few thousandths of an inch per stroke than in the conventional saw. In addition, because of the bevelling of the set teeth, the substantially right angular corner of the conventional set tooth is altered so that it is at an angle greater than 90 degrees. This results in reducing the high incidence of tooth chipping and breaking which characterizes the conventional set tooth.

It is a still further object of this invention to reduce the loss of stock which results from tooth impairment, as is well known in the art. Once certain of the teeth are chipped or broken, the kerf cut in the stock becomes biased rather than remaining vertical, and the stock will, therefore, not measure up to specifications.

The full nature of the invention will be understood from the accompanying drawings and the following description and claims:

Fig. 1 is a side elevational view of the invention having portions thereof cut away.

Fig. 2 is a top plan view thereof.

Fig. 3 is an enlarged perspective view thereof.

Fig. 4 is an end sectional view thereof, together with the kerf cut in the stock.

In the drawings 10 shows generally a hack saw of conventional size and length. Any suitable power source may be utilized to reciprocate the saw as is well known in the art, and for that reason none is illustrated herein.

Formed on the body 11 of the saw are the raker teeth 12 and the set teeth 13, there being one raker tooth provided for every two set teeth. As clearly appears in the drawings, the raker teeth have a cutting edge 14 which is disposed substantially at right angles to the longitudinal axis of the saw. The span or length of that edge is equal to the width of the saw body. A portion 15 of each set tooth, together with a portion of its cutting edge, projects laterally of the side of said body. Consequently the kerf A cut in the stock B is wider than the width of the saw. (See Fig. 4. It will also be observed that a portion of each set tooth laps a portion of the path or swath followed by its adjacent set tooth.

The beveled face of each set tooth is formed by two separate steps. The tooth is first beveled at an angle of approximately 45 degrees relative to the side of the saw body. Next the beveled face thus formed is in turn beveled rearwardly at an angle of approximately 22 degrees relative thereto. The contour of the bevelled face 16 thus formed defines a plane or rectilinear triangle, and more particularly a scalene triangle. The area of the bevelled face is such that slightly more than one-half of the original cutting edge is altered to form a sharp cutting edge of greater strength and durability. To state it another way, the cutting edge thus formed extends inwardly in the direction of the saw body to a point that is slightly beyond the vertical axis of each tooth. As a consequence, when the saw is operated the kerf that is cut will have upwardly and outwardly inclined edges (see Fig. 4). On the other hand, the outer cutting edges of the set teeth in the conventional hack saw define a substantially square corner. As a result there is a high rate of tooth chipping and breaking. It will also be observed that the cutting edge thus formed terminates at one point adjacent to but slightly laterally of the path or swath cut by the adjacent set tooth (see Fig. 4).

By reason of the area of the bevel and the angle of its inclination, a portion 17 of the following raker tooth extends outwardly of and beyond the plane thereof. This is shown in Fig. 4. It inevitably follows that the raker teeth perform more work than if the bevel were not present. Since the raker teeth are not laterally inclined relative to the vertical center of the saw, their cutting edges do not strike the stock at an angle as do those of the set teeth. This means that there is less likelihood of tooth chipping or breakage since it is the angular disposition of the set teeth relative to the stock being sawed that causes such tooth impairment. Since applicant's construction subtracts from the work performed by the set teeth and adds to that accomplished by the raker teeth, it follows logically that less tooth damage and breakage results from applicant's construction. Experience has proven this to be a fact. Not only is this true, but it is equally true that a deeper cut is negotiated by the saw on each stroke, since there is a greater concentration of weight and pounds pressure on the shortened cutting edge of the bevelled set teeth. Furthermore, the bevelling serves to fortify and strengthen the teeth.

While the invention has been described at some length in the preferred form, it is to be understood that changes and modifications may be made by those skilled in the art without departing from the spirit or principle of the invention. For example, the inner face of the set teeth may have a bevel formed thereon if desired.

The invention claimed is:

1. A hack saw including a plurality of set teeth each having a side projecting laterally of the adjacent side of said saw and a plurality of raker teeth interposed between adjacent set teeth, the projecting sides of said set teeth each being beveled to form a cutting edge that is disposed at an angle of approximately 45 degrees relative to the sides of said saw, one end of said edges terminating at a point adjacent the vertical axis of said respective set teeth, the cutting edges of said raker teeth projecting from the body of the saw in a plane beyond the plane of the cutting edges of said set teeth.

2. A hack saw including a plurality of set teeth each having a side projecting laterally of the adjacent side of said saw, a portion of each set tooth lapping the path followed by a portion of its adjacent set teeth, said projecting sides each being beveled to form a face terminating in a cutting edge which is disposed at an angle of approximately 45 degrees relative to the sides of said saw, one end of said edges terminating at a point adjacent to but slightly outside of the path followed by immediately adjacent set teeth, the portion of said face adjacent said cutting edge being relieved to provide clearance for said edge.

CHARLES C. ENLOW.

References Cited in the file of this patent

UNITED STATES PATENTS

| Number | Name | Date |
|---|---|---|
| 615,005 | Walquist | Nov. 29, 1898 |
| 1,603,755 | Erickson | Oct. 19, 1926 |
| 1,649,864 | Sherman | Nov. 22, 1927 |

FOREIGN PATENTS

| Number | Country | Date |
|---|---|---|
| 582,703 | Great Britain | Nov. 25, 1946 |